Patented Aug. 10, 1926.

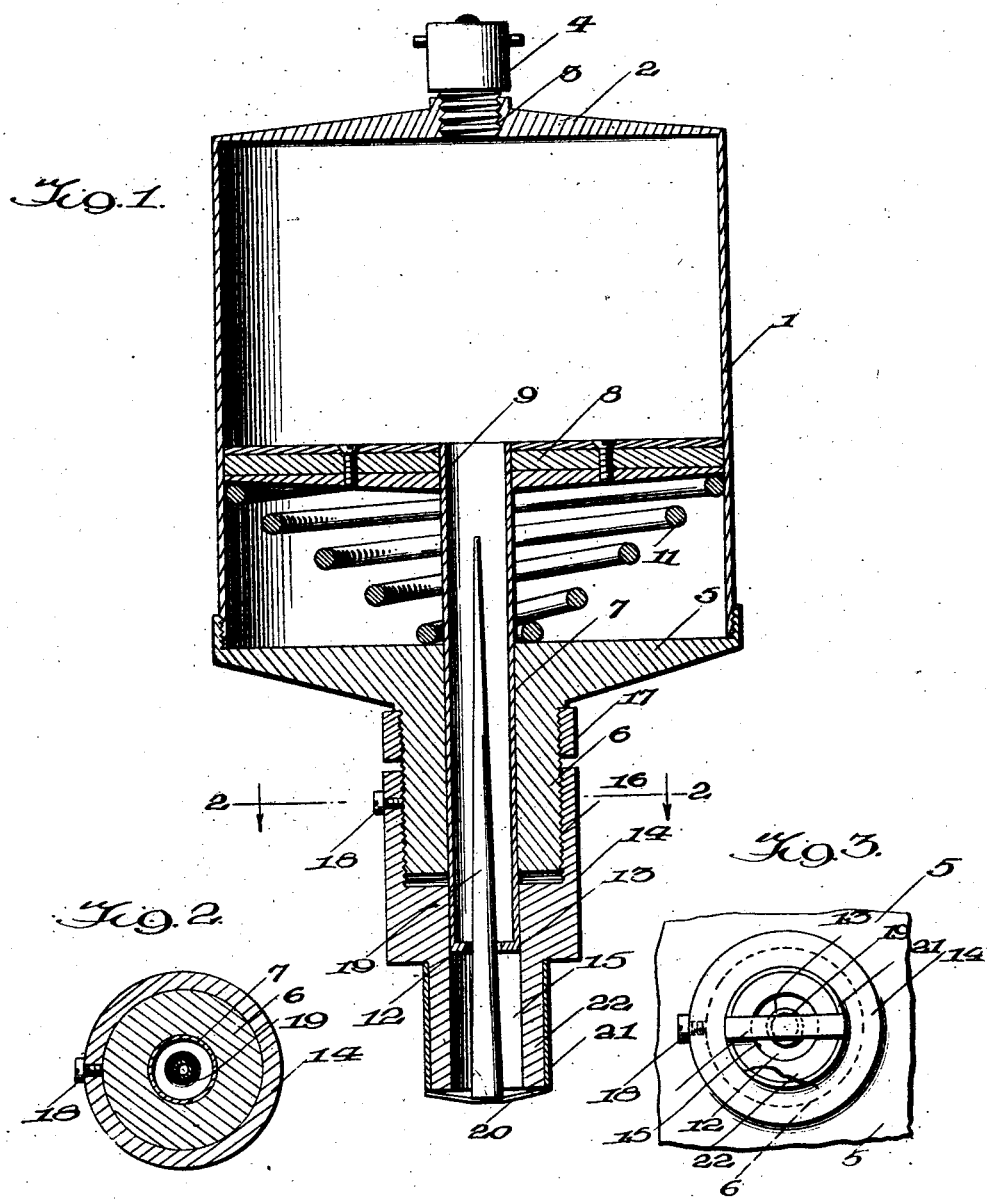

1,595,157

UNITED STATES PATENT OFFICE.

HORACE EMIL HOOVER, OF FORT LAUDERDALE, FLORIDA.

LUBRICANT CUP.

Application filed February 25, 1925. Serial No. 11,604.

My invention relates to improvements in lubricant receptacles of that type having a spring pressed plunger for forcing lubricant from the receptacle to a desired place, and it consists in the combinations, constructions and arrangements herein described and claimed.

An object of the invention is the provision of a lubricant receptacle of the character described, having an outlet, spring pressed means for forcing lubricant from the receptacle through the outlet, and means acting automatically to regulate the flow of lubricant through the outlet so that the volume of possible flow from the receptacle will vary inversely to the pressure exerted by the spring pressed means on the lubricant within the receptacle whereby the volume or flow of lubricant from the receptacle will be practically constant irrespective of the quantity of lubricant within the receptacle.

A further object of the invention is the provision of a lubricant receptacle of the character described which is simple in construction, reliable in use and thoroughly practical commercially.

Other objects and advantages of the invention will be apparent from the following description, considered in conjunction with the accompanying drawings in which:

Figure 1 is a longitudinal vertical section through the improved lubricant receptacle, Figure 2 is a section along the line 2—2 of Figure 1, and Figure 3 is a fragmentary bottom plan view of the receptacle.

The improved receptacle comprises a tubular body 1 which is closed at one end by a head 2 having a central intake opening 3 screw threaded for connection with a suitable fitting 4 for connecting the receptacle with a high pressure lubricating fluid supply means, not shown. The body 1 is closed at its opposite end by a screw cap 5 having a central boss or prolongation 6 on its outer face and having a central opening 7 extending through the head of the cap 5 and the boss 6. A plunger 8 is reciprocable in the body 1, and has a central opening 9 in which is secured an end portion of a tubular stem 10 which extends slidably in the opening 7. An expansion spring 11 is disposed within the body 1 between the plunger 8 and the cap 5 and tends to move the plunger 8 in the body 1 toward the head 2 or in other words, toward the intake end of the receptacle body. The tubular stem 10 is formed with an inwardly extending annular flange 12 at its outer end, thus defining an outlet opening 13 which is of less area in cross section than the bore of the tubular stem 10.

An adjusting sleeve 14 has a bore 15 in which the outer end portion of the tubular stem 10 is slidably received, and has a counter bore 16 extending from its inner end for a considerable part of the length of the sleeve, the counterbore being provided with screw threads engaged with external screw threads on the boss 6. The sleeve 14 therefore may be screwed on the boss 6 from the outer end of the latter against a stop ring 17 which is in threaded engagement with the inner end portion of the boss 6 or vice versa. A set screw 18 provides means for locking the sleeve 14 to the boss 6 in adjusted position on the latter. A regularly tapering fluid discharge regulating member 19 is supported by the sleeve 14 in spaced concentric relation to the inner wall of the bore of the sleeve 14 and extends through the outlet opening 13 into the tubular stem 7. In the form of the device exhibited in the drawings the tapering fluid discharge regulating member 19 is secured at its wider end to a cross bar 20 which is disposed diametrically of the adjusting sleeve 14 at the outer end of the latter, and may be held against movement relatively to the adjusting sleeve 14 by means of an attaching sleeve 21 to which the ends of the cross bar 20 are secured in any suitable known manner, and which is rigidly secured on the outer end portion 22 of the adjusting sleeve in any suitable known manner, as by being welded to the adjusting sleeve. The outer end portion 22 of the adjusting sleeve is reduced externally and this reduced outer end portion with the attaching sleeve 21 thereon may be projected in an opening leading to the bearing on the part that is to be lubricated, and if so desired, may be secured in said opening in any suitable known manner. With the arrangement just described, the fluid discharge regulating member 19 will decrease in cross sectional area from its outer end to its inner end and may be moved axially with the adjusting sleeve through the outlet opening 13 and in the tubular stem 7 in spaced concentric relation to the latter.

From the foregoing description of the various parts of the device, the operation thereof may be readily understood. The fitting 4 is for establishing connection between the interior of the lubricant body and the means for supplying lubricant under pressure to the lubricant body, as hereinbefore stated. With high pressure lubricant supply means of ordinary construction, lubricant will enter the body 1 more rapidly than it can pass from the body 1 through the tubular stem 7 and the space between the wall of the outlet opening 13 and the lubricant regulating member 19 when the sleeve 14 has been adjusted initially so that the space between the wall of the opening 13 and the fluid discharge regulating member 19 will have a desirable area when the plunger 8 is at the intake end of the receptacle body. The plunger 8 therefore will be moved toward the discharge end of the receptacle body and the receptacle body will be filled. The movement of the plunger 8 in the receptacle body of course will cause movement of the tubular stem 7 relatively to the fluid discharge regulating member 19 so that the effective area of the outlet at the end of the tubular stem 7 for the lubricant will decrease as the plunger 8 is moved from the intake end of the receptacle body toward the discharge end of the receptacle body. When the plunger 8 is at the discharge end of the receptacle body, the pressure which the spring 11 will exert thereon tending to eject lubricant from the receptacle body will be greater than at any other time, and this pressure will of course decrease regularly as the plunger 8 moves toward the intake end of the receptacle body. With an outlet opening of a constant area, the flow of lubricant from the receptacle body would decrease directly with the decrease of pressure exerted by the spring 11 on the plunger 8. This is undesirable and is obviated when my improved lubricant receptacle is used since the effective area of the outlet opening at the outer end of the tubular stem 7 increases directly as the pressure which the spring 11 exerts on the plunger 8 decreases and therefore, the volume of lubricant discharged from the lubricant receptacle as a result of the action of the spring pressed plunger 8 remains practically constant during the entire working stroke of the plunger 8.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. A lubricant receptacle having an inlet at one end and an outlet opening at its opposite end, a plunger reciprocable in said receptacle, said plunger having a central opening, a tubular stem having an end portion thereof secured in said central opening of the plunger and extending slidably through the outlet opening of the receptacle body, an expansion spring encircling said tubular stem and urging said plunger toward the intake end of the receptacle body, and means carried by said tubular body and extending within said tubular stem toward the intake end of the receptacle body for cooperating with the stem to vary the effective area of the outlet of said tubular stem as the pressure which the spring exerts on said plunger varies.

2. A lubricant receptacle comprising a tubular body, heads at opposite ends of said tubular body, one of said heads having an inlet opening adapted for connection with a source of pressure fluid supply, the head at the opposite end of said body having a central boss extending outwardly therefrom and having a central opening formed through the head and through said boss, a plunger reciprocable in said receptacle body, and said plunger having a central opening, a tubular stem having an end portion thereof secured in the central opening of the plunger and extending slidably through the opening of said second head and said boss, an adjusting sleeve threadedly engaged with said boss and having a bore in which the outer end portion of said tubular stem may slide, and a tapering fluid discharge regulating member supported at its outer end on said adjusting sleeve and extending through said adjusting sleeve into said tubular stem in spaced concentric relation to said tubular stem.

3. A lubricant receptacle comprising a tubular body, heads at opposite ends of said tubular body, one of said heads having an inlet opening adapted for connection with a source of pressure fluid supply, the head at the opposite end of said body having a central boss extending outwardly therefrom and having a central opening formed through the head and through said boss, a plunger reciprocable in said receptacle body, and said plunger having a central opening, a tubular stem having an end portion thereof secured in the central opening of the plunger and extending slidably through the opening of said second head and said boss, an adjusting sleeve threadedly engaged with said boss and having a bore in which the outer end portion of said tubular stem may slide, and a tapering fluid discharge regulating member supported at its lower end on said adjusting sleeve and extending through said adjusting sleeves into said tubular stem in spaced concentric relation to said tubular stem, said tapering fluid discharge regulating member decreasing regularly in cross sectional area from its lower to its upper end, said tubular stem having an inwardly extending flange at its outer end encircling said fluid discharge regulating member in spaced concentric relation to the latter.

HORACE EMIL HOOVER.